June 11, 1957 A. D. GILCHRIST 2,795,715
ROTOR CONSTRUCTION FOR ELECTRICAL MACHINES
Filed Nov. 16, 1954. 2 Sheets-Sheet 1

INVENTOR.
ALBERT D. GILCHRIST
BY Hudson, Boughton,
Williams, David & Hoffmann
ATTORNEYS June 11, 1957  A. D. GILCHRIST  2,795,715
ROTOR CONSTRUCTION FOR ELECTRICAL MACHINES
Filed Nov. 16, 1954  2 Sheets-Sheet 2

INVENTOR.
ALBERT D. GILCHRIST
BY Hudson, Boughton,
Williams, David & Hoffmann
ATTORNEYS United States Patent Office 2,795,715
Patented June 11, 1957

2,795,715
ROTOR CONSTRUCTION FOR ELECTRICAL MACHINES

Albert D. Gilchrist, Lyndhurst, Ohio, assignor to The Leece-Neville Company, Cleveland, Ohio, a corporation of Ohio Application November 16, 1954, Serial No. 469,091

3 Claims. (Cl. 310—261)

This invention relates to the manufacture of electrical machines of the rotary type, such as generators, and, more particularly, to a novel construction and method of production for the rotors of such electrical machines.

The invention is applicable to electrical machine rotors of various kinds, but is especially useful in rotors of the type comprising a pair of complemental magnetic circuit members having interengaged peripheral teeth forming an annular series of pole elements, such as are shown in the alternator of U. S. Patent No. 2,588,175, granted March 4, 1952. The invention is described hereinafter with reference to a rotor of this type but without any intention of limiting the invention solely to rotors of this form.

An object of this invention is to provide a construction and method for an electrical machine rotor in which annular magnetic circuit members are secured on a hub by deformed portions of the latter, preferably by expanded hollow or counterbored end portions of the hub.

Another object is to provide such a rotor construction and method in which a preformed coil-carrying rotor body unit is produced by shrinking a pair of complemental annular magnetic circuit members on reduced axial stem extensions of a hub, and in which the body unit thus obtained is mounted on a shaft by shrinking the hub into fixed connection with the shaft.

A further object is to provide a rotor construction of the character above-indicated which will be rugged and durable and relatively inexpensive to manufacture by reason of the use therein of a hub made from bar stock and annular magnetic circuit members in the form of metal stampings.

Still another object is to provide a rotor construction and method of the character indicated above in which the heating of a coil-carrying preformed rotor body unit for shrinking the rotor body onto a shaft is utilized to cure or bake an insulating and waterproofing fluid applied to the coil.

The invention can be further briefly summarized as consisting in certain novel combinations and arrangements of parts, and in certain novel method steps, which are described hereinafter and particularly set out in the claims hereof.

In the accompanying sheets of drawings forming a part of this specification:

Figure 1:
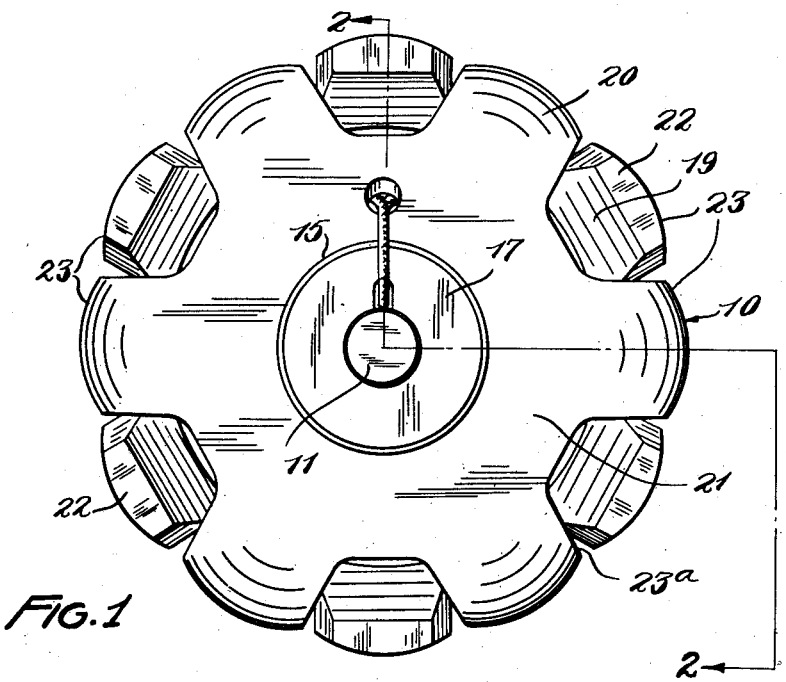
Fig. 1 is an end view of an electrical machine rotor constructed according to this invention.
Figure 2:
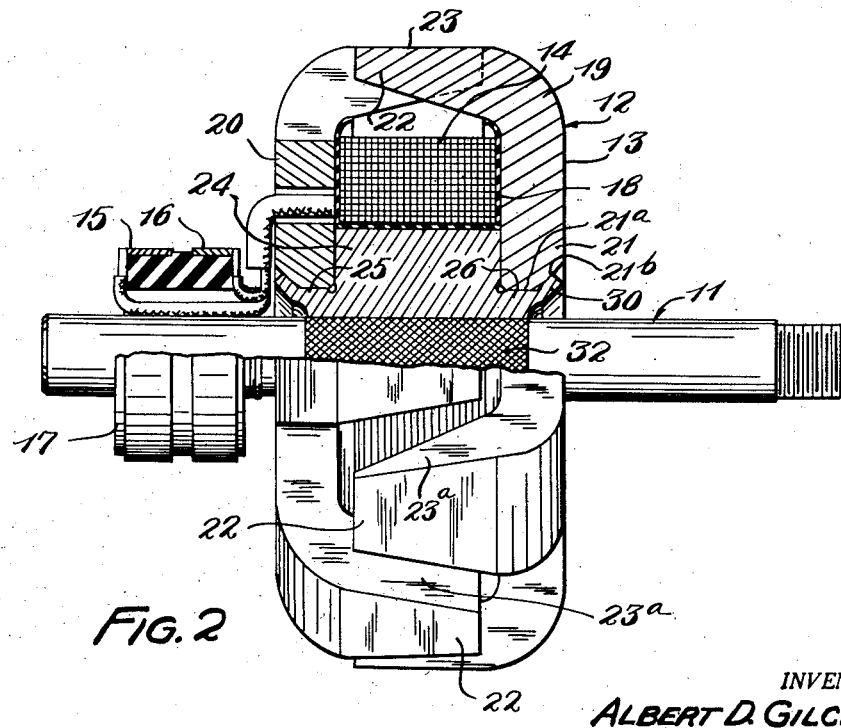
Fig. 2 is a side elevation of the rotor with a portion thereof shown in axial cross-section substantially as indicated by section line 2—2 of Fig. 1.

Proceeding now with a more detailed description of the invention, the electrical machine rotor 10 is shown in Figs. 1 and 2 as comprising, in general, a shaft 11 and a rotor body unit 12 mounted on such shaft. The rotor body unit 12, in turn, comprises a preformed multipart rotor body 13 and a coil 14 carried thereby. In this instance, the coil 14 is a field coil whose terminals are connected with a pair of slip rings 15 and 16 for supplying energizing current to the coil. The slip rings 15 and 16 are carried by an insulating body 17 which is mounted on the shaft 11 adjacent the rotor body 13.

The multipart rotor body 13 comprises a hub 18 and a pair of complemental annular or disk-like magnetic circuit members 19 and 20 secured to such hub. The coil 14 is disposed in surrounding relation to the hub 18 and in a space or chamber 14$^a$ located between and defined by the annular members 19 and 20.

These annular rotor members 19 and 20 are of a dished form, such that each member comprises a central disk-like portion 21 and an annular series of substantially axially extending teeth 22. The disk-like portion 21 of each rotor member has a central axial opening 21$^a$ which includes an annular bevel or chamfer 21$^b$. The rotor members 19 and 20 are preferably made as metal stampings by cold-working in suitable dies and, when so produced, require a minimum amount of machining and are less expensive than the forgings heretofore required for these intricately shaped members.

When the rotor members 19 and 20 are secured on the hub 18, the peripheral teeth of one rotor member extend into an axially interfitting relation between the teeth of the other rotor member, such that the teeth of both rotor members form a circumferentially extending row or series of pole elements 23. The individual teeth of one rotor member are separated from the teeth of the other rotor member by intervening air gaps 23$^a$.

The hub 18 is preferably made from bar stock for purposes of economy and comprises a substantially cylindrical central drum portion 24 and a pair of relatively reduced axial end stem projections 25 and 26. By reason of the relatively large diameter of the drum portion 24, the side faces of the latter provide axially oppositely facing abutment faces or shoulders 27 and 28 adjacent the stem projections 25 and 26.

The hub 18 is provided with a through axial opening 29 by which the rotor body unit 12 is mounted on the shaft 11, as is explained hereinafter. The axial opening 29 extends through the stem projections 25 and 26, and the end portions of this opening are enlarged by counterbores 25$^a$ and 26$^a$ formed in the outer ends of the stem projections, such that the end portions of these stem projections have a relatively thin-walled portion 30 which can be suitably expanded or deflected for mounting the rotor members 19 and 20 on the hub, as is explained hereinafter.

In accordance with the method of this invention, the parts of the rotor body unit 12 are assembled by the use of a series of method steps which will now be described. The hub 18 is chilled to a temperature of approximately $-40°$ F. to $-65°$ F. by means of Dry Ice, or other suitable cooling medium, for the purpose of shrinking the stem projections 25 and 26 thereof in transverse dimension. The rotor members 19 and 20 are heated to a temperature of approximately 300° F. to 350° F. by any suitable heating apparatus or medium for the purpose of expanding these members with respect to the transverse dimension of their central opening 21$^a$.

Figure 3:
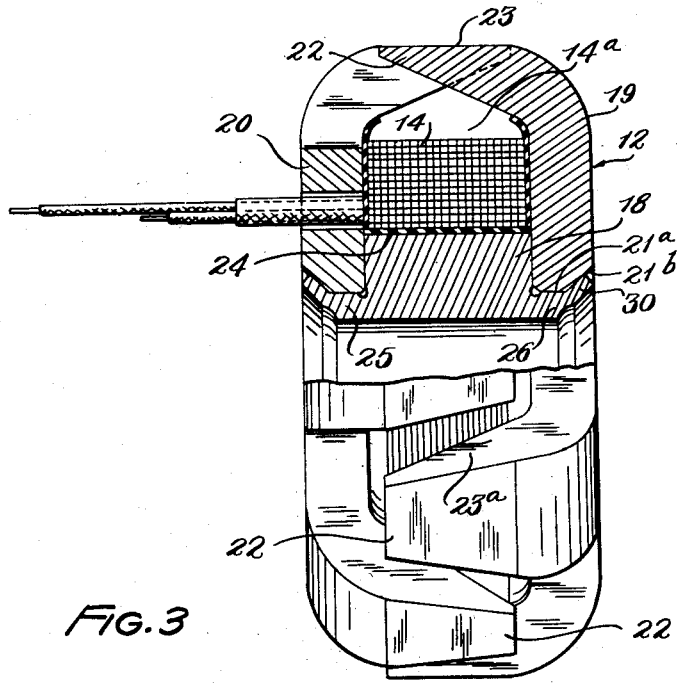
Fig. 3 is a side elevation showing the preformed rotor body unit detached from the shaft of Fig. 2, and with a portion of the rotor body shown in axial cross-section.
Figures 4, 5:
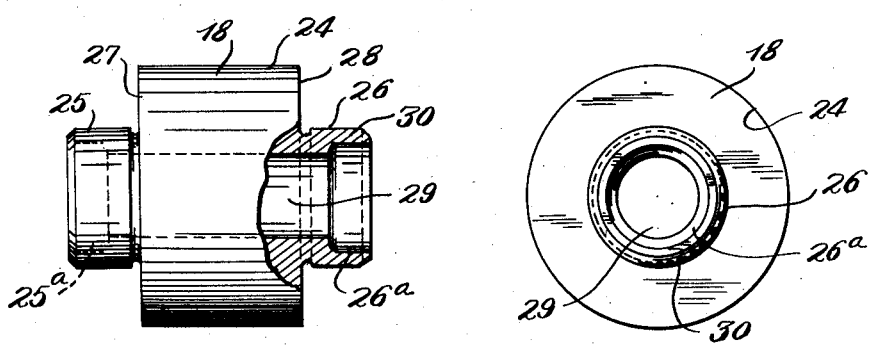
Fig. 4 is an elevation of the hub of the rotor body and showing such hub in detached relation with a portion thereof in section.
Fig. 5 is an end view of the hub.

The coil 14 is then disposed around the drum portion 24 of the chilled hub 18, and the rotor members 19 and 20 are assembled on the stem projections 25 and 26 in the complemental relation shown in Figs. 2 and 3, with the peripheral teeth 22 of these members in the above-mentioned interfitting engagement. In the mounting of the rotor members 19 and 20 on the hub 18, the stem projections 25 and 26 are engaged in the central openings 21ª of the rotor members with a so-called interference fit or press fit with the inner faces of the disk portions 21 seating against the abutment faces 27 and 28 of the hub. Equalization of the temperatures of the hub 18 and the rotor members 19 and 20 causes a shrink-fit connection to be produced between the rotor members and the stem projections 25 and 26, such that the rotor members will become locked to the hub and accurately positioned thereon with respect to the axis of the hub opening 29.

At a suitable point in the procedure and after the rotor members 19 and 20 have been placed on the stem projections 25 and 26, the thin-walled counterbored end portions 30 of these stem projections are expanded to the flared condition shown in Figs. 2 and 3 in which these expanded end portions engage the annular bevel 21ᵇ of the rotor members. The end portions 30, as thus expanded, act as locking elements in the nature of rivet heads which clamp the disk portions 21 of the rotor members 19 and 20 against the abutment faces 27 and 28 of the hub. The end portions 30 can be expanded into such holding or clamping engagement with the rotor members 19 and 20 by any suitable metal-working operation, such as spinning or swaging.

Although the rotor members 19 and 20 are preferably mounted on the stem extensions 25 and 26 of the hub 18 by the use of both the above-described shrink-fit engagement and the above-described expansion of the end portions 30, it should be understood that this invention contemplates that either one of these forms of connection could be used alone for mounting and securing the rotor members 19 and 20 on the hub 18.

The rotor body unit 12, as thus produced by the above-described assembly procedure, is now ready for mounting on the shaft 11. The present invention also provides a novel method procedure for mounting the rotor body unit 12 on the shaft 11, and this procedure will now be described.

In this final assembly procedure, the shaft 11 is chilled by Dry Ice, or other suitable cooling medium, to a temperature of approximately −40° F. to −65° F. for the purpose of reducing the transverse dimension thereof. A treating fluid of an insulating and waterproofing type, such as varnish, lacquer, or the like, is applied to the coil 14 so as to suitably coat and impregnate the same. The rotor body unit 12 is then heated to a temperature sufficiently high to cure or bake the treating fluid on the coil 14 without damaging the coil or the coating being produced thereon, such as a temperature of approximately 300° F. to 350° F. The heating of the rotor body unit 12 to this temperature also expands the hub 18 to thereby increase the transverse dimension of the through opening 29.

The chilled shaft 11 is then inserted into the through opening 29 of the hub 18 of the rotor body unit 12, and the equalization of the temperatures of the shaft and rotor body unit results in a shrink-fit connection between this unit and the shaft, such that the rotor body unit will be securely locked on the shaft for rotation therewith.

The shaft 11 is preferably made so that the diameter thereof, in relation to the transverse dimension of the through opening 29, will be such that the shaft engages in such opening with a fit of the kind referred to as a press fit or interference fit, and the tight engagement of the shaft in the hub opening resulting from this fit will be further strengthened by the shrink-fit engagement resulting from the temperature equalization mentioned above. The portion of the shaft 11 which is axially coextensive with the rotor opening 29 can, if desired, be provided with suitable knurling 32 for further increasing the holding force of the connection produced between the rotor body unit and the shaft.

After the rotor body unit 12 has been assembled on the shaft 11, as above explained, the insulating body 17 with the slip rings 15 and 16 thereon is mounted on the shaft, and the leads or terminal portions of the coil 14 are then suitably attached to the slip rings.

From the accompanying drawings and the foregoing detailed description, it will now be seen that this invention provides a rotor construction for electrical machines which is very rugged and durable and can be economically produced. Additionally, it will be seen that this invention has provided a novel method procedure for assembling the related parts of a multipart rotor body unit and for mounting such a rotor body unit on its supporting shaft.

Although the rotor and method of this invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. A rotor for an electrical machine comprising, a shaft, and a preformed rotor body unit fixed on said shaft, said body unit comprising a one-piece hollow hub having oppositely extending relatively reduced deformable tubular portions and axially outwardly facing annular shoulders surrounding said tubular portions, a pair of annular magnetic circuit members having radially disposed axially spaced disk portions mounted on said reduced tubular portions and also having toothed peripheral rim portions in axially interfitting engagement and defining a circumferential row of pole elements, and a coil surrounding said hub between said disk portions of said annular members, said tubular portions having the ends thereof mechanically expanded against said disk portions for clamping the latter against said shoulders.

2. A rotor as defined in claim 1 in which said shaft has a knurled portion, and in which said hub is fixed on said shaft by having a shrink-fit engagement with said knurled portion.

3. The method of making the rotor defined in claim 1 which comprises the steps of placing the coil on said hub, securing said annular members on said tubular portions by mechanically expanding the ends of the latter such that said annular members form with said hub and coil the aforesaid rotor body unit, applying heat curable treating fluid of the insulating and waterproofing type to said coil, chilling said shaft, heating said hub and in the same operation curing such treating fluid on said coil, placing said rotor body unit on said shaft, and permitting the temperatures of said shaft and rotor body unit to equalize for shrinking said hub on said shaft.

References Cited in the file of this patent

UNITED STATES PATENTS

| 441,246 | Lieb | Nov. 25, 1890 |
| 491,695 | Wood | Feb. 14, 1893 |
| 1,265,706 | Bardeen | May 7, 1918 |
| 1,597,340 | Best | Aug. 24, 1926 |
| 1,747,870 | Holtz | Feb. 18, 1930 |
| 2,198,689 | Wills | Apr. 30, 1940 |
| 2,606,948 | Jaeschke | Aug. 12, 1952 |

FOREIGN PATENTS

| 292,175 | Germany | May 27, 1916 |
| 755,491 | Germany | Oct. 19, 1953 |